Figure 1A:
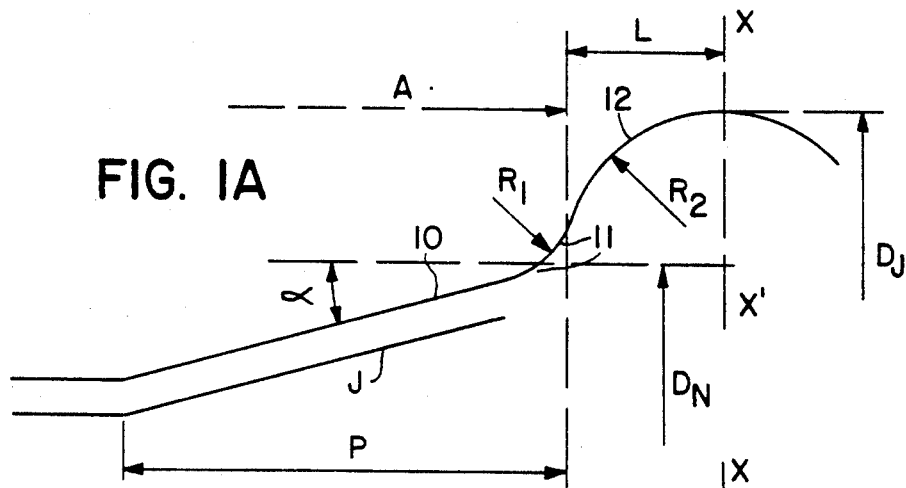

United States Patent [19]
Diernaz

[11] Patent Number: 5,232,032
[45] Date of Patent: Aug. 3, 1993

[54] ASSEMBLY CONSISTING OF A TIRE AND A REMOVABLE BEAD PROTECTOR

[75] Inventor: Christian Diernaz, Riom, France

[73] Assignee: Compagnie Generale des Etablissements Michelin - Michelin & Cie, Clermont-Ferrand, France

[21] Appl. No.: 838,434

[22] PCT Filed: Jul. 12, 1991

[86] PCT No.: PCT/FR91/00568

§ 371 Date: Mar. 6, 1992

§ 102(e) Date: Mar. 6, 1992

[87] PCT Pub. No.: WO92/01576

PCT Pub. Date: Feb. 6, 1992

[30] Foreign Application Priority Data

Jul. 17, 1990 [FR] France .................. 90/09212

[51] Int. Cl.⁵ .................................................. B60C 5/16
[52] U.S. Cl. ......................... 152/379.4; 152/381.4; 152/394
[58] Field of Search .......................... 301/95-98; 152/375, 379.3, 379.4, 379.5, 381.4, 384, 391, 393, 394

[56] References Cited

U.S. PATENT DOCUMENTS

| | | | |
|---|---|---|---|
| 4,108,232 | 8/1978 | Simpson | 152/365 |
| 4,373,567 | 2/1983 | Declercq | 152/405 |
| 4,422,490 | 12/1983 | Power | 301/63 DSX |
| 4,658,876 | 4/1987 | Augier | 152/394 |

FOREIGN PATENT DOCUMENTS 2456419 8/1976 Fed. Rep. of Germany ... 152/381.3
2414883 10/1976 Fed. Rep. of Germany ... 152/379.3

OTHER PUBLICATIONS

Abstract of Japanese Appl. No. 60-99047 of Sumitomo Rubber Ind Ltd., vol. 11 No. 111 (M-578) [2558] Apr. 8, 1987.

Primary Examiner—Russell D. Stormer
Attorney, Agent, or Firm—Brumbaugh, Graves, Donohue & Raymond

[57] ABSTRACT

An assembly formed of a tire and removable protector, intended to be mounted and used on a rim having frustoconical seats. The tire has beads (5) the outer contour of which is formed primarily by a frustoconical zone (80) substantially parallel to the axis of rotation and by a frustoconical zone forming an angle of between 45° and 90° with the axis of rotation. The removable protector (2), the contours of which are adapted on the one hand to the profile (10, 11, 12) of the mounting rim (J) and, on the other hand, to the profile (80, 81, 82) of the corresponding bead (5), is reinforced by a bead ring (3) around which there is wrapped a ply (4) forming two layers (41, 42) extending up to the point (40') of said removable protector (2). While improving the initial life of the tire, the invention permits easier and less expensive recapping.

4 Claims, 1 Drawing Sheet

ASSEMBLY CONSISTING OF A TIRE AND A REMOVABLE BEAD PROTECTOR

The present invention relates to tires without independent inner tube intended to be mounted on rims having seats which are inclined to the axis of rotation of the mounted tire by an angle of 15°±1° in accordance with the existing standards.

Such a tire has a radial carcass reinforcement anchored in each bead to at least one bead ring, generally formed of wires of rectangular cross section. Axially to the outside of the upturned part of the carcass reinforcement, there is a ply of cords or cables forming an angle of about 20° with the circumferential direction, this ply being intended to make the portion of the bead concerned rigid.

During the life of the tire, the portions of rubber in contact with the rim become worn by rubbing, particularly as foreign particles are frequently present between the rubber and the metal of the rim (sand, dirt, etc.). Furthermore, these portions are subjected to substantial heating, which may be so great that the rubber which is directly in contact with the rim hardens and "bakelites". Upon the recapping of the tread of the tire after travelling a number of miles, these damaged portions of bead can be repaired by the addition of rubber. These repair operations are complicated, lengthy and expensive.

In order to overcome these drawbacks, the invention proposes replacing the tire normally mounted on a rim with 15° frustoconical seats by an assembly formed of a tire and a reinforced removable bead protector capable of assuring proper mounting of the tire and the required tightness, it being easily replaced after deterioration upon travel.

In accordance with the invention, the tire assembly formed of a tire without inner tube, comprising a tread, a tread reinforcement, a carcass reinforcement anchored in each bead on at least one bead ring and removable protector, which assembly is intended to be mounted on a rim with 15° frustoconical seats and standard dimensions, is characterized by the fact that the removable protector which is intended to be inserted between the bead of the tire and the part of the rim formed of the seat and the rim lip, is a circular ring of reinforced rubber, of a width at least equal to the width of the frustoconical seats of the rim, and the radially inner profile of which, seen in meridian section, is identical to the corresponding profile of the service rim of the tire up to the top of the rim lip of diameter $D_J$, but the points of which furthest from the axis of rotation of the tire are on a circle of diameter $D_B$ perpendicular to the axis of rotation, which is between 0.9 and 1 times the diameter $D_J$ of the rim lip, the radially outer profile of which is formed of a frustoconical zone the generatrix of which is parallel to the radially inner generatrix, located at a distance (e) from said generatrix, (e) being between 2 mm and 10 mm, and extended axially towards the outside by a zone in the form of a circular arc having a radius equal to the corresponding radius of the zone of the inner profile, said circular-arc zone being tangent to a frustoconical zone the generatrix of which forms an angle $\beta$ of between 45° and 90° with the axis of rotation of the tire, this frustoconical zone being itself connected to the radially inner profile by a substantially circular zone surrounding at least one ply of cords or cables which are oriented at an angle of between 90° and 45° with respect to the circumferential direction and forming two reinforcement layers extending at least up to the axially inner point of the protector, after winding around a bead ring of a modulus of extension at least equal to 4000 MPa, located in the part of the removable protector intended to cover the rim lip, such that the ratio $$S = \frac{D_J - D_B}{D_T - D_B}.$$

is at least equal to 0.1, $D_T$ being the inner diameter of the bead ring of the removable protector, and by the fact that the tire has beads the base of which of axial width at most equal to the axial width of the removable protector is formed, seen in meridian section, by a frustoconical zone the generatrix of which forms an angle ($\gamma$) of between 15° and 25° with the axis of rotation of the tire, followed axially towards the outside by a circular arc tangent to a second frustoconical zone the generatrix of which forms the angle ($\beta$) with the axis of rotation of the tire.

By head ring of the removable protector there is understood any circular ring having a cross section of any shape and any composition, provided that said composition has a modulus of extension at least equal to 4000 MPa.

This ring may, for instance, be of any known plastic material, but it may also, like the customary bead rings, be formed of several assembled cords or cables or else several cords or cables coated in a plastic or elastic material and assembled.

The cross section is preferably circular and the bead ring is preferably of the braided type, that is to say, formed of cords or cables wound around a central core which may be a cord or a cable. The advantage of this type of bead ring is that it has a certain elongation under stress, which possible elongation facilitates the mounting of the axially outer part of the removable protector on the rim lip, while offering better distribution of the stresses.

The diameter of the cross section of the bead ring is a function of the strength desired, but it is preferably selected in such a manner that the junction zone between the generatrix of angle ($\beta$) of the radially outer profile of the protector and the axially inner end of the inner profile is circular, with the same thickness (e/2) around the bead ring, covered circularly by vulcanized rubber.

The cords or cables of the ply wound around the bead ring of the removable protector may be of textile or metal. They are preferably of textile since they are then less conductive of heat.

The following description, read with reference to the accompanying drawing, given by way of example, will make it better understood how the invention is carried out in practice.

Figure 1B:
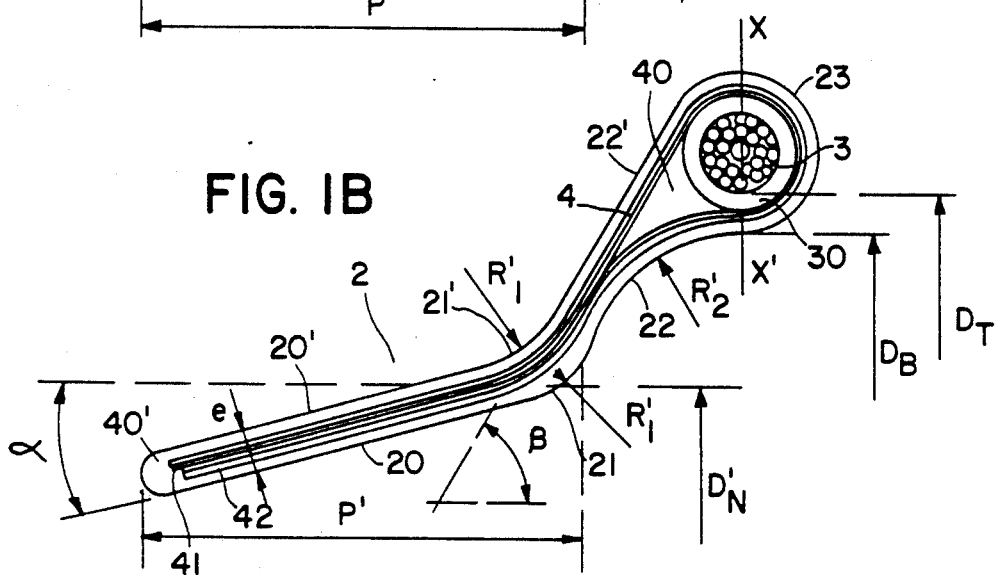
Figure 1C:
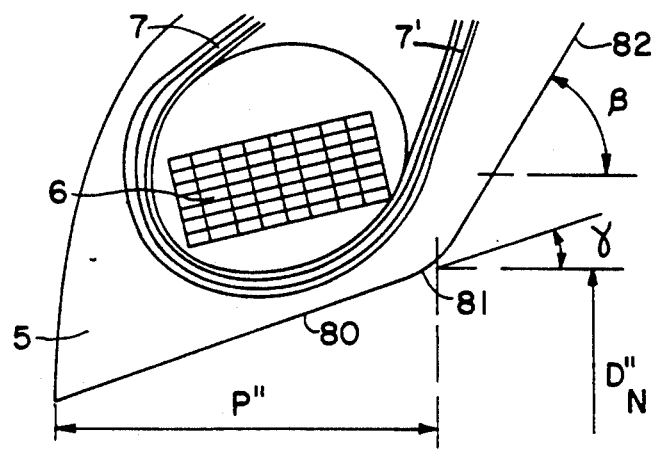

In the drawing, FIGS. 1A, 1B, 1C show separately each element of the assembly, namely the standard rim with conical seats, the removable protector, and the bead of the tire.

The rim (J) of FIG. 1A is a standard 22.5×9.00 rim the contours and the dimensions of which are set forth, for instance, in the book of the "Tire and Rim Association". This rim (J) comprises primarily, with respect to the invention, a frustoconical seat (10), the generatrix of the cone frustum forming an angle ($\alpha$) of 15°±1° with the axis of rotation of the tire, and a rim lip (12) formed of a circular portion of radius $R_2$ (12.7 mm), connected to the frustoconical seat (10) by a second circular portion (11) of radius $R_1$ (8 mm). The widths of rim (A) and of the frustoconical seat (P), as well as the distance (L) axially separating the axially outer end of the frustoconical seat (10) from the plane (XX') in which the circle is contained, the location of the points of the rim lip furthest from the axis of rotation, are standardized. The above circle has a diameter $D_J$ (597 mm) which is the diameter of the rim lip (12).

This diameter $(D_J)$ of the rim lip is greater by an amount $2R_2$ (25.4 mm) than the diameter $D_N$, the nominal diameter of the rim (J), equal to 571.5 mm.

In FIG. 1B, showing the contours, dimensions and structure of the removable protector (2), there can be noted the dimensions of the radially inner and outer profiles of the protector (2). The radially inner profile is formed of a frustoconical zone the generatrix (20) of which forms with the axis of rotation of the tire the angle ($\alpha$) of the frustoconical seat (10) of the rim (J), that is to say $15° \pm 1°$. The generatrix (20) is extended axially outward by a circular arc (21) of radius ($R_1'$) identical to the corresponding radius ($R_1$) of the rim (J), itself extended by a circular arc (22) of radius ($R'_2$) identical to the radius ($R_2$) of the corresponding portion (12) of the rim (J). The axially outer end of this portion (22) is in the plane (XX') containing the diameter $(D_J)$ of the rim lip (12). The radially inner profile (20, 21, 22) of the protector (2) is therefore identical to the profile (10, 11, 12) of the rim (J), but it is, as a whole, closer to the axis of rotation by an amount $$\frac{D_J - D_B}{2},$$

$D_B$ being the diameter of the circle, the location of the points of this inner profile furthest from the axis of rotation of the tire. Stated differently, the inner profile (20, 21, 22) of the protector (2) is obtained from the profile (10, 11, 12) of the standard rim (J) by a radial translation by an amount $$\frac{D_J - D_B}{2}$$

towards the axis of rotation. The width P' of the removable protector, measured as being the width of the frustoconical zone of the radially inner profile is equal in this example to the width P of the seat of the rim (J).

As to the radially outer profile (20', 21', 22') of the protector (2), it is formed of the generatrix (20') parallel to the generatrix (20) but separated from it by the distance $e = 4$ mm. The generatrix (20') is extended by the circular arc (21') of radius $R'_1$ of 8 mm. The generatrix (22') which forms an angle of 60° with the axis of rotation is tangent to this circular arc (21'). This generatrix (22') is connected to the circular arc (22) of the radially inner profile (20, 21, 22) by a curve (23), which is a circle in the case in question.

The removable protector (2) is reinforced in its axially outer part by a bead ring (3) surrounded by a coating mixture (30). This bead ring (3) is of the braided type and its inner diameter $D_T$ is equal to 606 mm so that the clamping (s) defined by the ratio described above is equal to 0.18. This clamping, associated with the fact that the inner profile of the protector (2) has, as a whole, a nominal diameter ($D'_N$) less than the nominal diameter ($D_N$) of the rim by the amount $D_J - D_B$, permits, on the one hand, an easy placing of the protector (2) on the rim (J), but also perfect holding of this protector on the rim (J). Around the bead ring (3) there is wound a ply (4) of $1680 \times 3$ polyamide cables. These cords form an angle of 90° with the circumferential direction, and the poly (4) gives rise to two layers (41) and (42) which are superimposed on each other, reinforcing in particular the axially inner part of the protector. Before the super-imposing of the two layers (41) and (42), the two strands of the ply (4) are separated by a rubber mix (40) or filling. The liner (40') of the ply (4) is asymmetrical so that it is thicker on one side than on the other, the thicker side forming the outer sheathing of the protector (2). In the case studied, for the given total thickness (e), the liner of small thickness is 0.2 mm, the layer of cords has a thickness of 0.8 mm and the liner of larger thickness is 1.0 mm.

The radius of the cross section of the bead ring (3), as shown in FIG. 1B, is so selected that the curve (23) connecting the circular arc (22) of the inner profile (20, 21, 22) to the frustoconical generatrix (22') of angle of 60° is a circle (23).

FIG. 1C shows the bead (5) of the tire intended to be mounted on the rim (J) provided with two removable protectors (2). This bead (5) contains a bead ring (6) with rectangular wires, having in cross section the shape of a parallelogram, and around which the carcass reinforcement (7) is wrapped to form the turn-up (7'). The base of the bead (5) of width P" less than P' and equal to 33 mm is formed of the frustoconical zone (80) forming the angle $\gamma$ equal to 20° with the axis of rotation, which zone is extended by the circular arc (81) which is tangent to the frustoconical zone (82) forming the angle ($\beta$) of 60° with the axis of rotation of the tire. The nominal diameter of the bead (5) ($D''_N$) is equal to ($D'_N$- e), which permits an effective clamping of the bead (5) on the protector (2), and therefore the proper holding of the tire on the rim provided with protectors, whatever the conditions of travel used.

When the tire and the removable protector (2) are manufactured separately, they can, on the other hand, be mounted on the service rim (U) either separately or together. In the former case, the tire is put in place after proper positioning of the removable protector on the rim (J). In the second case, the removable protector (2) is bonded in a first operation by means of rubber-base solution to the bead (5) of the tire, and the tire assembly is then mounted on the rim (J).

I claim:

1. In a tire assembly comprising a tire without independent inner tube having a tread, a tread reinforcement, a pair of beads (5) at least one bead ring in each bead and a radial carcass reinforcement (7) anchored in each bead (5) on at least one bead ring (6), a removable protector (2) on which the tire is intended to be mounted and a rim (J) of standard dimensions with 15° frustoconical seats (10) and rim flanges (12), the improvement wherein the removable protector (2), intended to be inserted between the bead (5) of the tire and the part of the rim (J) formed of the seat (10) and the rim flange (12), is a circular ring of reinforced rubber of width P', at least equal to the width (P) of the rim seats (J), the radially inner profile (20, 21, 22) of the protector, seen in meridian section, is identical to the corresponding outer profile (10, 11. 12) of the seat and flange of the rim (J) up to the top of the rim flange of diameter $D_J$, but the points of which furthest from the axis of rotation of the tire are on a circle of diameter $(D_B)$ perpendicular to the axis of rotation which is between 0.9 and 1 times the diameter $(D_J)$ of the rim flange, the radially outer profile (20', 21', 22') of the protector is formed of a frustoconical zone (20') the generatrix of which is parallel to the radially inner generatrix (20), located at a distance e from said generatrix (20), e being between 2 mm and 10 mm, and extended axially towards the outside by a zone (21') in the form of a circular arc having a radius equal to the corresponding radius $(R'_1)$ of the zone (21) of the inner profile, said zone (21') being tangent to a frustoconical zone (22') the generatrix of which forms an angle ($\beta$) of between 45° and 90° with the axis of rotation, the zone (22') being connected to the radially inner profile (20, 21, 22) by a substantially circular zone (23) surrounding at least one poly (4) of cords or cables oriented with respect to the circumferential direction by an angle of between 90° and 45° and forming two reinforcement layers (41, 42) extending up to the axially inner point of the protector (2), after winding around a bead ring (3) of a modulus of extension at least equal to 4000 MPa located in the part of the removable protector intended to cover the rim flange, such that the ratio $$S = \frac{D_J - D_B}{D_T - D_J}$$

$D_T$ being the inner diameter of the bead ring of the removable protector, and wherein the base of a tire bead of axial width (P'') is at most equal to the axial width (P') of the removable protector (2) and is formed of a frustoconical zone (80) the generatrix of which forms an angle ($\gamma$) of between 15° and 25° with the axis of rotation of the tire, followed axially towards the outside by a circular arc (81) which is tangent to a second frustoconical zone (82) the generatrix of which forms the angle ($\gamma$) with the axis of rotation.

2. In an assembly according to claim 1, a tire in which the bead ring (3) is of circular cross section and braided type.

3. In an assembly according to claim 2, a tire in which the bead ring (3) has a cross section the radius of which is such that the junction zone (23) between the radially inner and outer profiles is circular.

4. In an assembly according to claim 2, in which the ply (4) is formed of polyamide cables.

* * * * *

UNITED STATES PATENT AND TRADEMARK OFFICE
CERTIFICATE OF CORRECTION

PATENT NO. : 5,232,032

DATED : Aug. 3, 1993

INVENTOR(S) : Diernaz

It is certified that error appears in the above-identified patent and that said Letters Patent is hereby corrected as shown below:

Title page, 2nd col., 4th line, "2414883" should read --2514883--; first line of ABSTRACT, "and" should read --and a--. Col. 1, bridging lines 19-20, "particularly" should read --especially--; line 20, "particles" should read --particles (sand, dirt, etc.)--; line 21, delete "(sand, dirt, etc.)"; line 24, "'bakelites'" should read --"bakes"--; between lines 28 & 29, insert --SUMMARY OF THE INVENTION--; line 39, "and" should read --and a--; line 45, "rim lip" should read --rim flange--; line 50, "rim lip" should read --rim flange--; line 54, "rim lip" should read --rim flange--. Col. 2, line 6, "rim lip" should read --rim flange--; line 14, "of axial" should read --has an axial--; line 16, "is" should read --and is--; lines 23-24, "By head ring of the removable protector there is understood" should read --The bead ring of the removable protector can be--; line 30, delete "else"; line 41, "lip" should read --flange--; between lines 58 & 59, insert --DESCRIPTION OF THE DRAWING--; between lines 62 & 63, insert --DESCRIPTION OF PREFERRED EMBODIMENTS--. Col. 3, line 1, "rim lip" should read --rim flange--;

UNITED STATES PATENT AND TRADEMARK OFFICE
CERTIFICATE OF CORRECTION

PATENT NO. : 5,232,032
DATED : Aug. 3, 1993
INVENTOR(S) : Diernaz

It is certified that error appears in the above-indentified patent and that said Letters Patent is hereby corrected as shown below:

Col. 3, line 11, "rim lip" should read --rim flange--; line 12, "rim lip" should read --rim flange--; line 29, "rim lip" should read --rim flange--;

Col. 4, line 44, "rim (U)" should read --rim (J)--.

Col. 6, line 6, before "$D_T$" insert --is at least equal to 0.1,-- line 17, "angle ($\gamma$)" should read --angle ($\beta$)--.

Signed and Sealed this

Twenty-third Day of May, 1995

Attest:

BRUCE LEHMAN

*Attesting Officer*    *Commissioner of Patents and Trademarks*